United States Patent
Amirkiai et al.

[11] Patent Number: 5,341,259
[45] Date of Patent: Aug. 23, 1994

[54] PIVOTING, DUAL STATE MAGNETIC LATCH FOR DISK FILE ACTUATOR

[75] Inventors: Maziar Amirkiai, Sunnyvale; Oliver W. Northrup, Mountain View; Ali Hosseinzadeh, Fremont, all of Calif.; Naoki Yamasaki; Takayuki Noma, both of Matsuyama, Japan

[73] Assignee: Quantum Corporation, Milpitas, Calif.

[21] Appl. No.: 964,762

[22] Filed: Oct. 22, 1992

[51] Int. Cl.$^5$ .......................... G11B 5/54; G11B 21/22
[52] U.S. Cl. ...................................... 360/105
[58] Field of Search ................. 360/105, 106, 75, 104; 369/78.12, 74; 335/177, 178, 179, 205, 207, 229, 230, 231, 232, 233, 234, 235

[56] References Cited

U.S. PATENT DOCUMENTS

| | | | |
|---|---|---|---|
| 4,139,874 | 2/1979 | Shiraishi | 360/86 |
| 4,300,176 | 11/1981 | Gilovich et al. | 360/105 |
| 4,594,627 | 6/1986 | Viskochil et al. | 360/105 |
| 4,654,735 | 3/1987 | Israelev et al. | 360/104 |
| 4,660,120 | 4/1987 | Manzke et al. | 360/137 |
| 4,686,595 | 8/1987 | Bryer | 360/106 |
| 4,692,827 | 9/1987 | Campbell | 360/105 |
| 4,706,142 | 11/1987 | Hattori et al. | 360/105 |
| 4,716,480 | 12/1987 | Wiens et al. | 360/105 |
| 4,751,595 | 6/1988 | Kishi et al. | 360/105 |
| 4,764,831 | 8/1988 | Patel | 360/105 |
| 4,868,695 | 8/1989 | Quatro et al. | 360/104 |
| 4,881,139 | 11/1989 | Hazebrouck | 360/105 |
| 4,890,176 | 12/1989 | Casey et al. | 360/105 |
| 4,903,157 | 2/1990 | Malek | 360/105 |
| 4,947,274 | 8/1990 | Casey et al. | 360/105 |
| 4,951,943 | 7/1990 | Perry | 360/105 |
| 4,965,684 | 10/1990 | Stefansky | 360/78.12 |
| 4,985,793 | 1/1991 | Anderson | 360/105 |
| 5,003,422 | 3/1991 | Sun et al. | 360/105 |
| 5,023,736 | 6/1991 | Kelsic et al. | 360/105 |
| 5,025,335 | 6/1991 | Stefansky | 360/97.01 |
| 5,034,837 | 7/1991 | Schmitz | 360/105 |
| 5,095,395 | 3/1992 | Wakatsuki | 360/105 |
| 5,109,310 | 4/1992 | Ohkjita et al. | 360/106 |
| 5,208,713 | 5/1993 | Lindsay et al. | 360/105 |

FOREIGN PATENT DOCUMENTS

| | | | |
|---|---|---|---|
| 2214076 | 8/1990 | Japan | 360/109 |
| 426968 | 1/1992 | Japan | 360/106 |
| 90/05360 | 5/1990 | PCT Int'l Appl. | G11B 5/54 |

Primary Examiner—Robert S. Tupper
Assistant Examiner—William J. Klimowicz
Attorney, Agent, or Firm—David B. Harrison

[57] ABSTRACT

A toggling, dual state magnetic latch is provided for a disk file rotary head positioner rotatably mounted relative to the base and includes a voice coil for rotary displacement within a magnetic field provided by an actuator voice coil permanent magnet. The latch comprises a latch pin formed of a ferromagnetic material located on an arm extending from the voice coil of the actuator; a latch mounting pivot pin mounted to the base, a latch body rotatably mounted to the latch mounting pivot pin and positionable between an unlatched position and a latched position, the latch body including a toggle portion carrying a latch permanent magnet and including a counterweight portion located generally oppositely of the toggle portion for carrying counterweight for counterweighting the latch body about an axis of rotation aligned with the latch mounting pivot pin, a bias force mechanism including the voice coil permanent magnet for applying a predetermined bias force to the latch body in order to maintain it at the unlatched position, the latch body and the latch pin being so located that as the latch pin moves in a direction toward the latch body and reaches a predetermined distance to the latch permanent magnet, the bias force is rapidly overcome, and the latch body toggles to a latched position such that the latch pin is directly adjacent to the latch permanent magnet when the actuator has positioned the data transducer head at a landing zone on the storage disk.

10 Claims, 2 Drawing Sheets

→ UNLATCH DIRECTION

← LATCH DIRECTION

PIVOTING, DUAL STATE MAGNETIC LATCH FOR DISK FILE ACTUATOR

FIELD OF INVENTION

The present invention relates to latching mechanisms within a disk drive. More particularly, the present invention relates to a pivoting, dual state magnetic latch for latching a disk file actuator, so that the data transducer heads are parked and maintained by the latch at a predetermined landing zone, yet are freely positionable throughout a range of concentric data tracks without a bias force attributable to the latch.

BACKGROUND OF THE INVENTION

In accordance with Winchester fixed disk drive technology, a data transducer head slider "flies" upon an air bearing effect in very close proximity, e.g. 4-5 microinches, to a proximate disk data storage surface. The air bearing exists only when the storage disk is rotating. When the disk stops rotating, in a "contact-start-stop" disk drive, the head sliders "land" on the disk surface. Storage media is frequently provided with an overcoat or a lubricating coat in order to withstand direct contact between the head slider and the storage surface. Consequently, some disk drive manufacturers permit the slider to land at any location of the data storage disk.

Direct contact between the disk and the heads may abrade or interfere with the storage media. Data recorded at the location of direct contact may be changed, or a permanent defect known as a "hard error" may develop. Accordingly, many disk drive manufacturers provide a dedicated landing zone for the head sliders. This landing zone is usually selected to be at an innermost useable radius of the data storage disk, as magnetic storage cells or domains are fewest at the radially inwardmost area of the disk.

Head sliders are typically formed of highly lapped ferro ceramic material. The edges of the rails are very sharp. Radial displacement of the head sliders while in contact with the data storage surface has proven very detrimental to the integrity of the storage surface. Such movements may gouge, scratch or scrape away the magnetic data storage coating. Thus, a latch is conventionally provided to lock the head positioner assembly (herein "actuator") at the landing zone when power is removed from the disk drive and/or the spindle motor is not spinning (as may occur during a reduced power standby state).

Actuator latches have taken many forms. One approach pioneered by the assignee of the present invention has been an aerodynamically released actuator latch which operates to release the actuator in response to airflow generated by disk rotation which overcomes a bias force; see, e.g. commonly assigned U.S. Pat. Nos. 4,538,193; 4,692,829 and 4,647,997. One drawback of the approaches described in these patents is that with small disk diameters, such as 3.5" and below, unenhanced airflow from a single disk is generally insufficient to enable the aerodynamic actuator latch to operate reliably within a manufacturable design for mass production of disk drives.

Bistable electromagnetic latches have been proposed in the prior art. Pertinent examples include U.S. Pat. No. 4,881,139 to Hazebrouck; U.S. Pat. No. 4,654,735 to Izraelev et al.; U.S. Pat. No. 4,965,684 to Stefansky; and U.S. Pat. No. 4,903,157 to Malek. Other patents considered in preparation of the application leading to this patent include U.S. Pat. Nos. 4,890,176 and 4,947,274 to Casey et al.; U.S. Pat. No. 4,868,695 to Quatro et al.; U.S. Pat. No. 4,851,943 to Perry; U.S. Pat. No. 4,764,831 to Patel; U.S. Pat. No. 4,751,595 to Kishi et al.; U.S. Pat. No. 4,706,142 to Hattori et al.; U.S. Pat. No. 4,686,595 to Bryer; U.S. Pat. No. 4,660,120 to Manzke et al.; U.S. Pat. No. 4,139,874 to Shiraishi; U.S. Pat. No. 4,594,627 to Viskochil et al.; and U.S. Pat. No. 4,716,480 to Wiens et al.

Commonly assigned U.S. patent application No. 07/696,629, filed on May 7, 1991, now U.S. Pat. No. 5,208,713 and entitled, "Bistable Magnetic/Electromagnetic Latch for Disk File Actuator," describes an improved bistable latch employing magnetic and electromagnetic elements for latching a disk file actuator so that data transducer heads are parked and maintained at a predetermined landing zone. Although this device works effectively for its intended purpose, it requires a number of components and is relatively expensive to make. In addition, this prior latch operated satisfactorily within only a narrow range of operating currents, limiting the range of power supplied from an external power supply.

Another approach which is pertinent to the present invention is described in U.S. Patent No. 5,025,335 to Stefansky. This patent describes an actuator latch employing a fixed capture permanent magnet assembly for capturing a radially extended, magnetically permeable capture body of the rotary voice coil actuator as the landing zone is approached. One drawback of fixed capture magnets is their tendency to EXERT a bias force upon the actuator as the vicinity of the parking zone is reached, thereby interfering with servo loop control of head position at the radially innermost tracks.

Hence, despite the numerous and varied approaches exemplified by the above patents, hitherto unsolved need has remained to continue to develop effective, low cost mechanisms for latching a disk drive actuator to maintain the heads in the landing zone when the disk is not spinning.

SUMMARY OF THE INVENTION WITH OBJECTS

A general object of the present invention is to provide a latch for a disk drive actuator which overcomes limitations and drawbacks of prior approaches.

A more specific object of the present invention is to provide a magnetically permeable latch pin on the actuator assembly and a toggling, two state magnetic latch body to realize a dual state magnetic latch having a desired hysteresis characteristic for latching and releasing a disk drive rotary voice coil actuator, and which minimally influences the actuator throughout its useful range of concentric data storage tracks.

Another specific object of the present invention is to provide a magnetic latch for a disk drive actuator which may be configured to have considerably more holding power in a toggled or pivoted latch position when latching the actuator than is present in a non-pivoted release position.

Yet another specific object of the present invention is to provide a dual state magnetic latch including a toggling body for coacting with a latch pin portion of a moving voice coil actuator, and a few stationary parts, so as to be realized at very low additional cost.

Yet another object of the present invention is to provide a pivoting, dual state magnetic latch for a disk drive wherein the latch is normally biased to a non-pivoted release position by a magnetic repulsion force applied by a permanent magnet field of the rotary voice coil actuator motor.

In accordance with principles of the present invention, a toggling, dual state magnetic latch is provided for a disk file rotary head positioner rotatably mounted relative to the base and includes a voice coil for rotary displacement within a magnetic field provided by an actuator voice coil permanent magnet. The latch comprises a latch pin formed of a ferromagnetic material located on an arm extending from the voice coil of the actuator; a latch mounting pivot pin mounted to the base, a latch body rotatably mounted to the latch mounting pivot pin and positionable between an unlatched position and a latched position, the latch body including a toggle portion carrying a latch permanent magnet and including a counterweight portion located generally oppositely of the toggle portion for carrying counterweight for counterweighting the latch body about an axis of rotation aligned with the latch mounting pivot pin, a bias force mechanism including the voice coil permanent magnet for applying a predetermined bias force to the latch body in order to maintain it at the unlatched position, the latch body and the latch pin being so located that as the latch pin moves in a direction toward the latch body and reaches a predetermined distance to the latch permanent magnet, the bias force is rapidly overcome, and the latch body toggles to a latched position such that the latch pin is directly adjacent to the latch permanent magnet when the actuator has positioned the data transducer head at a landing zone on the storage disk.

In one aspect of the present invention, a first limit pin is provided for limiting movement of the latch body beyond the unlatched position, and a second limit pin is provided for limiting movement of the latch body beyond the latched position. In a related aspect, the toggle portion includes a paddle section extending radially outwardly therefrom. The paddle section is adapted to rest against the first limit pin at the unlatched position, and to reset against the second limit pin at the latched position.

In a further aspect, the voice coil permanent magnet includes a permanent magnetic field-providing pole for providing a magnetic field in repulsion of a field provided by the latch permanent magnet.

As a related facet of the present invention a method is provided for latching a voice coil head positioner actuator in accordance with a predetermined hysteresis characteristic related to direction of movement of the actuator in order to position and maintain a data transducer head at a parking location defined on a rotatable data storage disk and further in order to position the data transducer head at selected ones of a multiplicity of concentric data storage tracks of the disk without bias force influence being exerted by a latching mechanism within a disk drive including a base and wherein the actuator is moveably mounted relative to the base. The method comprises the steps of:

moving a latch pin formed of a ferromagnetic material in accordance with movement of the actuator, positioning a latch body to the base at a location adjacent to the latch pin when the actuator has positioned the data transducer head at the parking location, the latch body being mounted for movement of a toggle portion thereof containing a latch permanent magnet along a toggle locus between an unlatched position and a latched position, applying a predetermined bias force to the latch body to maintain it at the unlatched position until the latch pin reaches a predetermined distance to the latch permanent magnet at which the bias force is overcome and the latch body toggles to the latched position, and bringing the latch pin to a location directly adjacent to the permanent magnet when the actuator has positioned the data transducer head at the parking location on the storage disk.

As one aspect of this facet of the invention, the step of applying a predetermined bias force to the latch body comprises the step of providing a fixed permanent magnet field of the actuator for repelling a field of the latch permanent magnet.

DETAILED DESCRIPTION OF A PREFERRED EMBODIMENT

Figure 1:
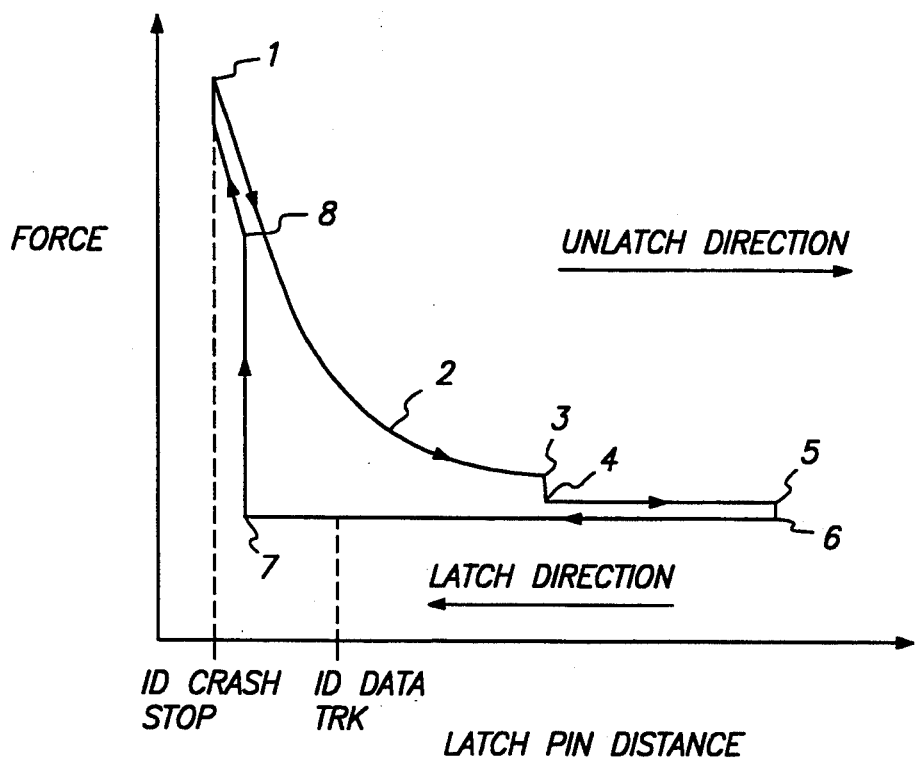
FIG. 1 is a hysteresis graph showing force applied by the dual state pivoting magnetic latch in function of various positions of a rotary actuator voice coil and further in function of seek direction of the actuator.

In order to appreciate and understand the present invention, reference is first directed to FIG. 1. FIG. 1 is a graph of actuator latch force applied to a rotary voice coil actuator as a function of radial displacement of the actuator and rotational direction thereof. At a first position denoted by reference numeral 1, a pivoting dual state magnetic latch structure 40 in accordance with principles of the present invention exerts a maximum latching force upon a magnetically permeable latch pin mounted to an extension of the rotary voice coil. In this position of maximum latching force, the actuator structure positions a data transducer head of a disk drive 10 at a landing/parking zone at a radially innermost region of a data storage disk surface above which the head flies when the disk rotates at a nominal operating angular velocity.

As a driving current is applied to the actuator coil, a resultant force causes the actuator to rotate in a radially outward, unlatch direction as shown in FIG. 1. The force applied by the latch mechanism permanent magnet decreases generally exponentially, as shown at reference numeral 2 in FIG. 1. As the magnetically permeable latch pin moves farther away from the latch magnet, a discontinuity occurs, as at reference numeral 3, which denotes that the latch mechanism has now pivoted away from the latch pin to an unlatched position in response to a bias force (applied preferably by a stray magnetic repulsion field of the voice coil motor structure). Further displacement of the rotary actuator in the unlatch direction results in an invariant or constant bias force and illustrates virtually no biasing influence of the permanent magnet of the now-retracted latch mechanism, as at radial positions denoted by reference numerals 4 and 5.

When the rotary actuator is caused by a reverse direction driving current to move in a radially inward direction relative to the storage disk, as shown at reference numerals 6 and 7 in FIG. 1, the retracted latch mechanism permanent magnet exerts virtually no bias force influence over the permeable latch body, including when a radially innermost data track, labelled "ID data trk" in FIG. 1 is reached. At a further radially inward position, denoted by reference numeral 7 in FIG. 1, the magnet of the latch mechanism 40 becomes sufficiently attracted to the latch pin to cause the latch mechanism 40 to pivot toward the approaching actuator latch pin. At this point, the field of the permanent magnet within the pivoting latch structure captures the magnetically permeable latch pin body of the actuator extension, and quickly draws the pin into a latched position, as shown at reference numerals 8 and 1 in FIG. 1. The radial position of an inner crash stop which limits angular displacement of the rotary actuator structure is denoted by dashed lines in FIG. 1 and labelled "ID Crash Stop" along the abscissa of the FIG. 1 graph.

In order further to appreciate the present invention, a presently preferred structural embodiment thereof is illustrated in FIGS. 2–6 in combination with a head and disk assembly ("HDA") 10 of a fixed disk drive data storage subsystem. The HDA 10 includes a formed base 12 to which all other elements of the HDA 10 are mounted and/or referenced structurally. At least one data storage disk 14 is mounted within an enclosed interior space of the HDA 10, e.g. as defined by continuous sidewalls of the base 12 and a removable cover (not shown in FIG. 2). The storage disk 14 is mounted to the base 12 via a spindle assembly 16 containing, e.g. an in-hub DC brushless spindle motor. The spindle motor rotates the disk 14 at a predetermined angular velocity, such as 3600 RPM.

While the storage disk 14 may have any suitable diameter, it most preferably comprises a submicro-Winchester form factor, such as approximately 2.5 inches, or smaller. Thus, evidently FIG. 2 is somewhat enlarged over an actual HDA embodying the principles thereof.

An exemplary mass balanced rotary voice coil actuator assembly 18 includes a head arm 20 to which is mounted at least one load beam 22. The load beam 22 supports a data storage transducer head slider 24 at an outer peripheral region thereof. The slider 24 includes a data transducer head, most preferably formed as a thin film head, for example. The load beam 22 is designed to act as a spring as well as a support, and it applies a predetermined loading force on the head slider 24 to urge it toward the data storage surface of the disk 14. This force is overcome by the air bearing generated by rotation of the disk 14 during operations of the data storage subsystem of which the HDA 10 is an integral part. When the actuator assembly 18 is in the latched position, that is it is engaging the permeable portion of the latch housing 40, the head arm 20 abuts the ID crash stop pin 62.

Figure 2:
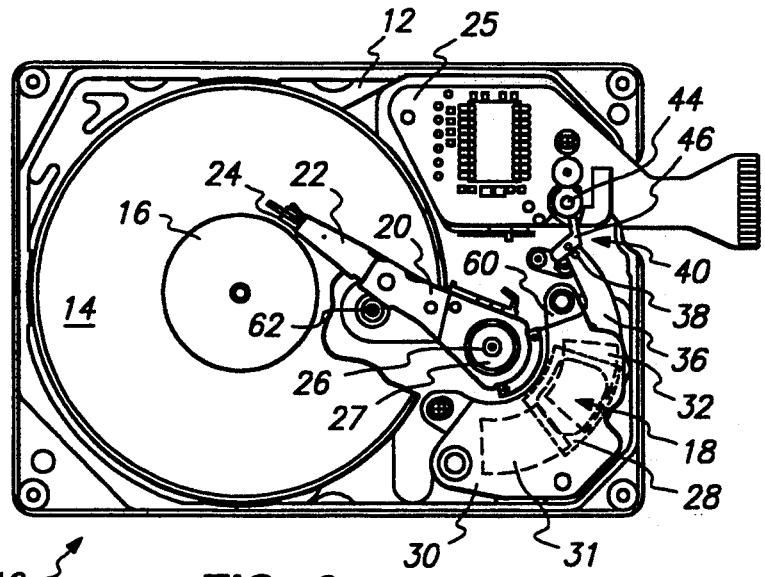
FIG. 2 is an enlarged plan view of a head and disk assembly for e.g. a submicro Winchester fixed drive, including a pivoting, dual state magnetic latch in accordance with the principles of the present invention.

The rotary actuator assembly 18 is mounted to a shaft 26 fixed to the base 12 by suitable bearings (an upper bearing 27 is shown in FIG. 2), so that the actuator 18 is generally free to rotate along a locus of limited rotational displacement, thereby moving the head 24 from an outer region of the disk 14 to an inner region thereof, including a radially inwardmost landing zone LZ (which is directly under the head 24 in the first radial position 1 of FIG. 1 as shown in FIG. 2.) Electronics circuitry, such as a read preamplifier/write driver and switch circuit, and other related circuit elements are mounted to e.g. a flexible plastic film circuit substrate 25. An extension of the substrate 25 exits the interior space of the HDA between an upper lip of the base sidewall and a gasket sealing the cover to the upper lip of the continuous sidewall.

Also included within the rotary actuator assembly 18 is a flat, generally wedge shaped actuator voice coil 28 (shown in outline form in FIG. 2). The actuator voice coil 28, comprising a coil of insulated small gauge copper wire, is preferably formed integrally with the head arm 20 by conventional plastic encapsulation/molding techniques. The flat voice coil 28 is positioned within a magnetic gap formed between an upper flux return plate 30 of high magnetic permeability such as steel and a lower flux return plate 33 (FIG. 5) formed of the same material.

Two high flux intensity permanent magnets 31 and 32 (also shown in FIG. 2 in outline form) are secured to the upper flux return plate 30. In an alternative preferred embodiment where greater flux density is required, two magnets (not shown) are also secured to the lower flux return plate 33 and have pole faces of opposite polarity directly facing opposite legs of the coil 28. The magnets and resultant intense magnetic fields are such that current passing through the coil 28 in one direction causes rotation of the actuator assembly 18 in one radial direction relative to the disk 14 such as the radially outward "unlatch" direction, while reverse current causes reverse direction movement such as the radially inward "latch" direction. The high flux intensity magnets may comprise ceramics of a magnetized rare earth element such as neodymium, for example.

In accordance with principles of the present invention, a latch arm extension 36 is preferably formed as an integral part of the actuator coil 28 and in the present example extends from one side thereof toward the pivotable latch mechanism 40. The latch arm extension 36 includes a highly permeable magnetic material body or latch pin 38.

The latch mechanism 40 comprises in combination with the latch arm extension 36 and the latch pin 38 a molded plastic latch body 42 which is pivotally mounted to a pin 44 staked in the base 12. A locking clip or ring (not shown) retains the latch body 42 on the pin 44. A permanent magnet 46 is embedded in one arm 48 of the latch body 42, while a nonmagnetic counterweight 50 (e.g. a brass slug) is embedded in a counterbalance arm 52 of the latch body 42. The counterweight 50 aids in reducing response of the latch body 42 to shock and vibration forces otherwise tending to dislodge it from the fully latched position shown in FIGS. 2 and 4.

The arm 48 of the latch body 42 includes an outer tab extension 54 which cooperates with two fixed location pins 56 and 58 which effectively limit the range of pivotal displacement of the latch body 42. The pins 56 and 58 are staked to the base 12 of the HDA 10. The pin 56 limits latch body displacement at the fully latched position, and the pin 58 limits pivot member displacement at the unlatched position (see FIGS. 6D, 6E and 6F).

Figure 3:
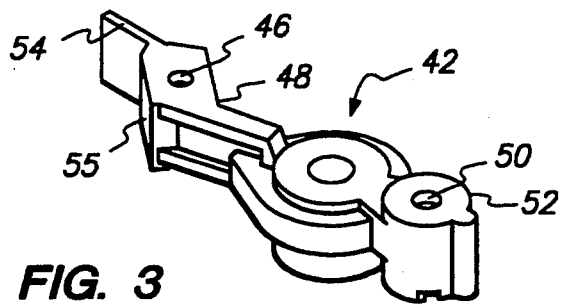
FIG. 3 is an enlarged perspective view of the dual state magnetic latch mechanism shown in the FIG. 2 head and disk assembly.
Figure 4:
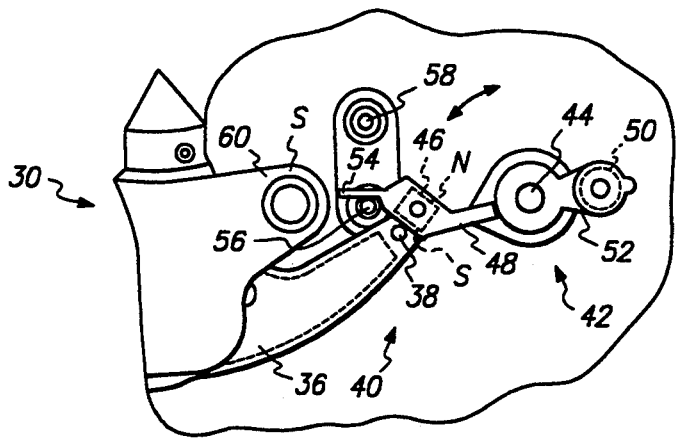
FIG. 4 is a greatly enlarged plan view of the latch mechanism in accordance with principles of the present invention.
Figure 5:
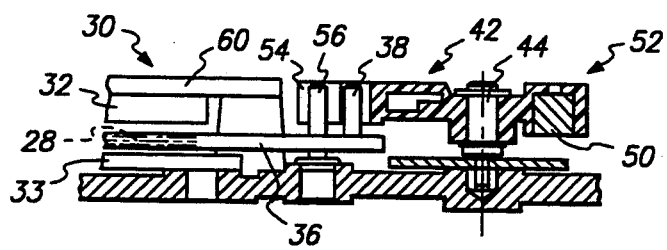
FIG. 5 is a side view in section and elevation of the structural portion shown in FIG. 4.

For example, the upper magnetic flux return plate 30 may include an asymmetrical extension portion 60 which is closer to the latch magnet 46 than an edge of the lower flux return plate 33. The extension portion 60 thus effectively directs e.g. a south pole magnetic fringe flux toward the magnet 46. The magnet 46 is arranged so that its south pole generally faces the extension 60. The south pole fringe flux from the extension 60 and the facing south pole of the latch magnet 46 result in a repulsion force which biases with a predetermined suitable bias force the latch body 42 to the unlatched position. As the latch pin 38 comes into proximity with the latch magnet 46, the high level of permeability of the latch pin 38 overcomes the repulsion bias force, and the latch body 42 pivots toward the pin 56 so as to approach closely the latch pin 38 of the arm 36 extending from the rotating portion of the voice coil actuator structure 18. A thin plastic wall portion 55 of the latch body 42 separates the magnet 46 and the latch pin 33 at the latched position, as shown in FIGS. 3 and 4.

Figures 6A, 6B, 6C, 6D:
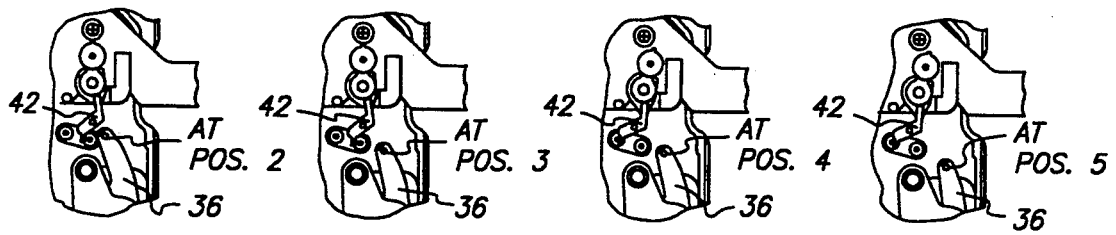
FIGS. 6A, 6B, 6C, 6D, 6E, 6F and 6G are plan views of the latch mechanism of FIG. 2 at various operating positions in function of actuator displacement and direction of movement as noted in FIG. 1.
Figures 6E, 6F, 6G:
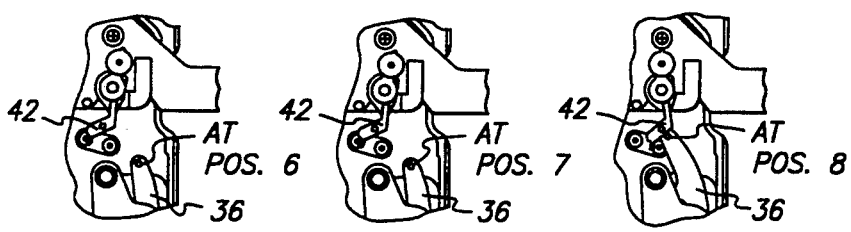

To more fully explain the operation of the pivoting dual state magnetic latch in the context of a disk drive, reference is now made to FIG. 6A-G along with the diagram of FIG. 1 which shows the force versus distance curve for the latch mechanism 40 when the head arm 20 is in various positions and moving either in an unlatching direction (FIGS. 6A-D), or in a latching direction (FIGS. 6E-G).

In FIGS. 6A-G only those portions of the disk drive assembly 10 that are pertinent to the operation of the present invention are identified by reference numerals to allow for ease of understanding. It should be understood, however, that in all respects the disk drive assembly 10 shown in FIGS. 6A-G is the same as the assembly 10 shown in FIG. 2.

Referring now to FIG. 2, what is shown is the latch body 42 in very close proximity (latching position) with respect to the actuator latch the pin 38 of the actuator assembly 18. This position corresponds to point 1 on the curve of FIG. 1.

During a recalibration routine, a current is inputted to the VCM 28 by a conventional current source. The current flowing through the actuator coil 28 will cause the actuator to move from the latched/head parking position at the landing zone LZ in a radially outward ("unlatch") direction.

Referring now to points 2 and 3 (FIGS. 6A and 6B respectively) on the curve of FIG. 1, as is seen the force drops off significantly although the latch body 42 is still adjacent to the latch limit pin 56. At some point the attraction force will be reduced below the repulsion force applied by the magnetic plate extension 60 and the latch magnet 46 (points 4 and 5 of FIG. 1 and FIGS. 6C and 6D respectively). This will cause the latch body 42 to toggle or pivot to the unlatched state as limited by the unlatch limit pin 58. Movement of the latch body 42 to the unlatch state can be caused either by the magnetic repulsion force from the magnet flux return plate extension 60, or by a spring that biases the latch body toward the unlatch limit pin 58.

When in the unlatched state the actuator assembly 18 will operate freely throughout its useful range of limited angular displacement relative to the data tracks without experiencing any degradation of its performance otherwise due to the latch magnet 46. To park the actuator assembly 18 again at the landing zone LZ position, a reverse current is applied to VCM 28. Refer now to FIGS. 6E, 6F and 6G, and to FIG. 1, points 6, 7 and 8. When the actuator passes the last ID data track prior to hitting an inner diameter crash stop 62, the attraction force between the latch magnet 46 of the latch body 42 and the actuator latch pin 38 increases above the repulsion force between the latch housing and the VCM. Therefore, the latch body 42 will toggle back to the latched state, causing a sharp increase in attractive force and thereby latching the actuator 18 at the head parking position.

Accordingly, as is seen a dual state pivotal magnetic latch assembly is provided that has utility over previously known latching assemblies utilized with disk drives. There are many advantages to such a latch assembly because of its simplicity, low cost, ease of implementation and absence of extraneous influence during drive operations. The latch assembly of the present invention has significant advantages over previously known latching mechanisms, particularly for a submicro-Winchester disk drive because it can utilize significantly less area, and works reliably without extra electrical requirements or airflow requirements.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention.

What is claimed is:

1. A toggling, dual state magnetic latch for latching a disk file rotary voice coil actuator for positioning a data transducer head relative to a rotatable data storage disk within a hard disk drive including a base and wherein the actuator is moveably mounted relative to the base; the latch comprising;

latch pin means formed of a ferromagnetic material located on a rotating part of the actuator;

latch mounting pivot pin means mounted to the base, latch body means rotatably mounted to the latch mounting pivot pin means and rotating between an unlatched position and a latched position in a plane of rotation substantially parallel to a plane of rotation of the rotary voice coil actuator, the latch body means being formed of a nonmagnetic material and including a toggle portion for holding and enclosing a permanent magnet means, bias force means including a permanent magnetic field providing pole of a voice coil motor of the actuator for providing a magnetic field in repulsion of a field provided by the permanent magnet means for applying a predetermined bias force to the latch body means to maintain it at the unlatched position, the latch body means and the latch pin means being so located that as the latch pin means reaches a predetermined distance to the permanent magnet means, the bias force is overcome, and the latch body means rotates to a latched position, the latch pin means thereupon coming into contact with a part of the toggle portion which is directly adjacent to the permanent magnet means when the actuator has positioned the data transducer head at a landing zone on the storage disk.

2. The toggling, dual state magnetic latch in accordance with claim 1 in which the latch body means comprises a counterweight portion located generally oppositely of the toggle portion, and including counterweight means for counterweighting the latch body means about an axis of rotation aligned with the pivot pin means.

3. The toggling, dual state magnetic latch in accordance with claim 1 further comprising first limit pin means mounted to the base for limiting movement of the latch body means beyond the unlatched position, and second limit pin means mounted to the base for limiting movement of the latch body beyond the latched position.

4. The toggling, dual state magnetic latch of claim 3 in which the toggle portion includes a paddle section extending outwardly therefrom, the paddle section adapted to rest against the first limit pin means at the unlatched position, and to rest against the second limit pin means at the latched position.

5. The toggling, dual state magnetic latch of claim 1 wherein said latch body means is molded as a unitary body of a plastic material.

6. The toggling, dual state magnetic latch of claim 1 wherein the actuator comprises an arm means of nonmagnetic material extending from a rotating coil portion of the actuator, and wherein the latch pin means is located at an outward end region of the arm means.

7. A toggling, dual state magnetic latch for latching a disk file rotary actuator for positioning a data transducer head relative to a rotatable data storage disk within a hard disk drive including a base and wherein the actuator is rotatably mounted relative to the base and includes a voice coil molded within a voice coil body of a nonmagnetic material for rotary displacement within a magnetic field provided by voice coil permanent magnet means, the latch comprising;

latch pin means formed of a ferromagnetic material located on a nonmagnetic arm integrally formed with, and extending from the voice coil body of the actuator;

latch mounting pivot pin means mounted to the base, latch body means molded of nonmagnetic material and rotatably mounted to the latch mounting pivot pin means substantially parallel with a plane of rotation of the rotary actuator and positionable between an unlatched position and a latched position, the latch body means including a toggle portion defining a well for receiving and for carrying a latch permanent magnet means and including a counterweight portion located generally oppositely of the toggle portion defining a well for receiving and for carrying counterweight means for counterweighting the latch body means about an axis of rotation aligned with the latch mounting pivot pin means, bias force means including a permanent magnetic field providing pole of a voice coil motor of the actuator for providing a magnetic field in repulsion of a field provided by the permanent magnet means for applying a predetermined bias force to the latch body means to maintain it at the unlatched position, the latch body means and the latch pin means being so located that as the latch pin means moves in a direction toward the latch body and reaches a predetermined distance to the latch permanent magnet means, the bias force is rapidly overcome, and the latch body means toggles to a latched position such that the latch pin means is in contact with a part of the toggle portion which is directly adjacent to the latch permanent magnet means when the actuator has positioned the data transducer head at a landing zone on the storage disk.

8. The toggling, dual state magnetic latch in accordance with claim 7 further comprising first limit pin means mounted to the base and cooperating with the latch body means for limiting movement of the latch body means beyond the unlatched position, and second limit pin means mounted to the base and cooperating with the latch body means for limiting movement of the latch body beyond the latched position.

9. The toggling, dual state magnetic latch of claim 8 in which the toggle portion includes a paddle section integrally formed therewith and extending outwardly therefrom, the paddle section adapted to to rest against the first limit pin means at the unlatched position, and to rest against the second limit pin means at the latched position.

10. The toggling, dual state magnetic latch of claim 7 wherein the latch body is molded of plastic material.

* * * * *